(12) United States Patent
Yasukawa

(10) Patent No.: US 9,892,062 B2
(45) Date of Patent: Feb. 13, 2018

(54) INFORMATION PROCESSING APPARATUS CAPABLE OF BACKING UP AND RESTORING KEY FOR DATA ENCRYPTION AND METHOD FOR CONTROLLING THE SAME

(71) Applicant: CANON KABUSHIKI KAISHA, Tokyo (JP)

(72) Inventor: Akari Yasukawa, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 14/960,069

(22) Filed: Dec. 4, 2015

(65) Prior Publication Data
US 2016/0162418 A1    Jun. 9, 2016

(30) Foreign Application Priority Data

Dec. 9, 2014    (JP) .................................. 2014-249410

(51) Int. Cl.
*H04L 29/06* (2006.01)
*G06F 12/14* (2006.01)
*H04L 9/08* (2006.01)
*G09C 1/00* (2006.01)

(52) U.S. Cl.
CPC ........... *G06F 12/1408* (2013.01); *G09C 1/00* (2013.01); *H04L 9/0816* (2013.01); *G06F 2212/1052* (2013.01); *H04L 2209/12* (2013.01)

(58) Field of Classification Search
CPC ......... G06F 12/1408; G06F 2212/1052; G09C 1/00; H04L 9/0816; H04L 2209/12
See application file for complete search history.

(56) References Cited

U.S. PATENT DOCUMENTS

| | | | | |
|---|---|---|---|---|
| 7,239,704 B1* | 7/2007 | Maillard | ............... | H04L 9/0822 348/E5.004 |
| 7,242,768 B2* | 7/2007 | Challener | ............... | G06F 21/62 380/43 |
| 7,415,115 B2* | 8/2008 | Ma | .......................... | G06F 21/64 380/277 |
| 7,506,367 B1* | 3/2009 | Ishibashi | ................. | G06F 21/10 380/203 |
| 7,929,706 B2* | 4/2011 | Li | ............................ | G06F 21/57 380/277 |

(Continued)

FOREIGN PATENT DOCUMENTS

JP    2008236089 A    10/2008

*Primary Examiner* — David Garcia Cervetti
(74) *Attorney, Agent, or Firm* — Canon USA, Inc., IP Division

(57) ABSTRACT

An information processing apparatus includes a storage device configured to store data, an encryption chip configured to store an encryption key therein, a nonvolatile memory configured to store a backup encryption key, and a control unit configured to confirm whether the data stored in the storage device has been correctly decrypted by using the encryption key, and when the data has not been correctly decrypted, restore the backup encryption key to the encryption chip, and when the data has been correctly decrypted, back up the backup encryption key, which is a backup of the encryption key, stored in the encryption chip into the nonvolatile memory.

15 Claims, 3 Drawing Sheets

(56) References Cited

U.S. PATENT DOCUMENTS

| | | | | |
|---|---|---|---|---|
| 8,560,785 B1* | 10/2013 | Malhotra | | G06F 21/6218 711/162 |
| 8,561,209 B2* | 10/2013 | Goel | | G06F 21/57 726/27 |
| 8,811,619 B2* | 8/2014 | Khatri | | G06F 21/575 380/279 |
| 8,935,188 B2* | 1/2015 | Duffield | | H04L 43/045 706/12 |
| 9,071,429 B1* | 6/2015 | Roth | | H04L 9/3268 |
| 9,094,288 B1* | 7/2015 | Nucci | | H04L 43/026 |
| 9,489,528 B2* | 11/2016 | Goel | | H04L 9/0891 |
| 2001/0056431 A1* | 12/2001 | Sharples | | G06F 9/54 |
| 2002/0035573 A1* | 3/2002 | Black | | G06Q 30/02 |
| 2003/0097439 A1* | 5/2003 | Strayer | | H04L 63/1408 709/224 |
| 2004/0172545 A1* | 9/2004 | Ogata | | G06F 21/79 713/189 |
| 2004/0199791 A1* | 10/2004 | Poletto | | H04L 41/0893 726/23 |
| 2004/0221190 A1* | 11/2004 | Roletto | | H04L 41/0893 714/4.1 |
| 2005/0044213 A1* | 2/2005 | Kobayashi | | H04L 43/10 709/224 |
| 2006/0128406 A1* | 6/2006 | Macartney | | H04L 63/1416 455/466 |
| 2007/0280187 A1* | 12/2007 | Wang | | H04L 63/1416 370/338 |
| 2008/0069361 A1* | 3/2008 | Cho | | H04L 63/065 380/277 |
| 2008/0103982 A1* | 5/2008 | Hammad | | G06Q 20/085 705/66 |
| 2008/0120698 A1* | 5/2008 | Ramia | | H04L 63/08 726/4 |
| 2008/0120707 A1* | 5/2008 | Ramia | | H04L 63/0861 726/5 |
| 2008/0188188 A1* | 8/2008 | Malomsoky | | H04L 43/0852 455/90.2 |
| 2008/0226080 A1* | 9/2008 | Li | | G06F 21/57 380/277 |
| 2008/0226081 A1* | 9/2008 | Terao | | G06F 21/62 380/277 |
| 2009/0234899 A1* | 9/2009 | Kramer | | G06F 17/30539 708/200 |
| 2009/0262657 A1* | 10/2009 | Ekelin | | H04L 41/0896 370/252 |
| 2010/0037314 A1* | 2/2010 | Perdisci | | H04L 63/1416 726/22 |
| 2010/0299287 A1* | 11/2010 | Cao | | H04L 41/142 706/12 |
| 2011/0090950 A1* | 4/2011 | Bush | | H04N 19/196 375/240.02 |
| 2011/0149960 A1* | 6/2011 | Fernandez Gutierrez | | H04L 12/18 370/390 |
| 2011/0219111 A1* | 9/2011 | Shevenell | | G06F 15/173 709/224 |
| 2011/0283361 A1* | 11/2011 | Perdisci | | G06F 21/56 726/24 |
| 2011/0286555 A1* | 11/2011 | Cho | | H04L 27/0006 375/343 |
| 2011/0296195 A1* | 12/2011 | Nakagawa | | G06F 11/2094 713/189 |
| 2011/0314542 A1* | 12/2011 | Viswanathan | | G06F 21/554 726/23 |
| 2013/0013542 A1* | 1/2013 | Sen | | G06N 99/005 706/12 |
| 2013/0305374 A1* | 11/2013 | Rubin | | G06F 21/554 726/24 |
| 2014/0041032 A1* | 2/2014 | Scheper | | H04L 63/14 726/23 |
| 2014/0068258 A1* | 3/2014 | Chao | | G06F 11/1469 713/167 |
| 2015/0052601 A1* | 2/2015 | White | | H04L 63/1416 726/13 |
| 2015/0120639 A1* | 4/2015 | Shin | | G06N 99/005 706/52 |
| 2015/0271787 A1* | 9/2015 | Wong | | H04B 7/0608 370/329 |
| 2015/0295945 A1* | 10/2015 | Canzanese, Jr. | | G06F 9/45545 726/23 |
| 2016/0063358 A1* | 3/2016 | Mehrseresht | | G06F 17/30256 382/190 |
| 2016/0065369 A1* | 3/2016 | Kakutani | | H04L 9/0897 380/286 |
| 2016/0072969 A1* | 3/2016 | Nakahara | | H04N 1/00344 358/1.15 |
| 2016/0110657 A1* | 4/2016 | Gibiansky | | G06N 99/005 706/12 |
| 2016/0293006 A1* | 10/2016 | Bauer | | G08G 1/095 |
| 2017/0054684 A1* | 2/2017 | Ohzaki | | H04L 63/0245 |

* cited by examiner

INFORMATION PROCESSING APPARATUS CAPABLE OF BACKING UP AND RESTORING KEY FOR DATA ENCRYPTION AND METHOD FOR CONTROLLING THE SAME

BACKGROUND OF THE INVENTION

Field of the Invention

The present invention relates to a method for backing up and restoring an encryption key stored in an information processing apparatus.

Description of the Related Art

There has been known an information processing apparatus capable of storing data by using a storage device such as a hard disk drive (hereinafter, referred to as an HDD). To prevent stolen data from being decoded, many of such information processing apparatuses are provided with an encryption function for encrypting data to protect data. In an information processing apparatus provided with the encryption function, an encryption key used for data encryption is securely stored in an encryption chip on a controller board.

However, if the information processing apparatus brakes down or malfunctions, the controller board including the encryption chip may be replaced. When the controller board is replaced, the encryption chip storing the encryption key is replaced together with the controller board. In this case, the encryption key will be lost and the data stored in the HDD becomes impossible to be decrypted.

Japanese Patent Application Laid-Open No. 2008-236089 discusses a technique for restoring an encryption key to prevent data loss due to the replacement of a controller board. In a case where the validity of a key for decrypting data stored in an HDD cannot be confirmed, the technique discussed in Japanese Patent Application Laid-Open No. 2008-236089 shifts an information processing apparatus to a restoration mode and then restores an encryption key by using an encryption key for restoration backed up in an external storage medium such as a Secure Digital (SD) card.

In a conventional information processing apparatus, to back up and restore an encryption key, a user needs to prestore an encryption key for restoration in an external storage medium through a user's operation. Therefore, if the user forgets to back up the encryption key, decryption of data stored in a HDD becomes impossible.

SUMMARY OF THE INVENTION

According to an aspect of the present invention, an information processing apparatus includes a storage device configured to store data, an encryption chip mounted on a first board of the information processing apparatus, and configured to store an encryption key therein, the encryption chip encrypting data to be written into the storage device by using the encryption key, and decrypting data read from the storage device by using the encryption key, a nonvolatile memory mounted on a second board, and configured to store a backup encryption key, and a control unit configured to confirm whether the data stored in the storage device has been correctly decrypted by using the encryption key, and when the data has not been correctly decrypted, restore the backup encryption key to the encryption chip, and when the data has been correctly decrypted, back up the backup encryption key into the nonvolatile memory.

According to an aspect of the present invention, it is possible to back up and restore an encryption key without troubling a user.

Further features of the present invention will become apparent from the following description of exemplary embodiments with reference to the attached drawings.

DESCRIPTION OF THE EMBODIMENTS

An exemplary embodiment of the present invention will be described below with reference to the accompanying drawings.

Figure 1:
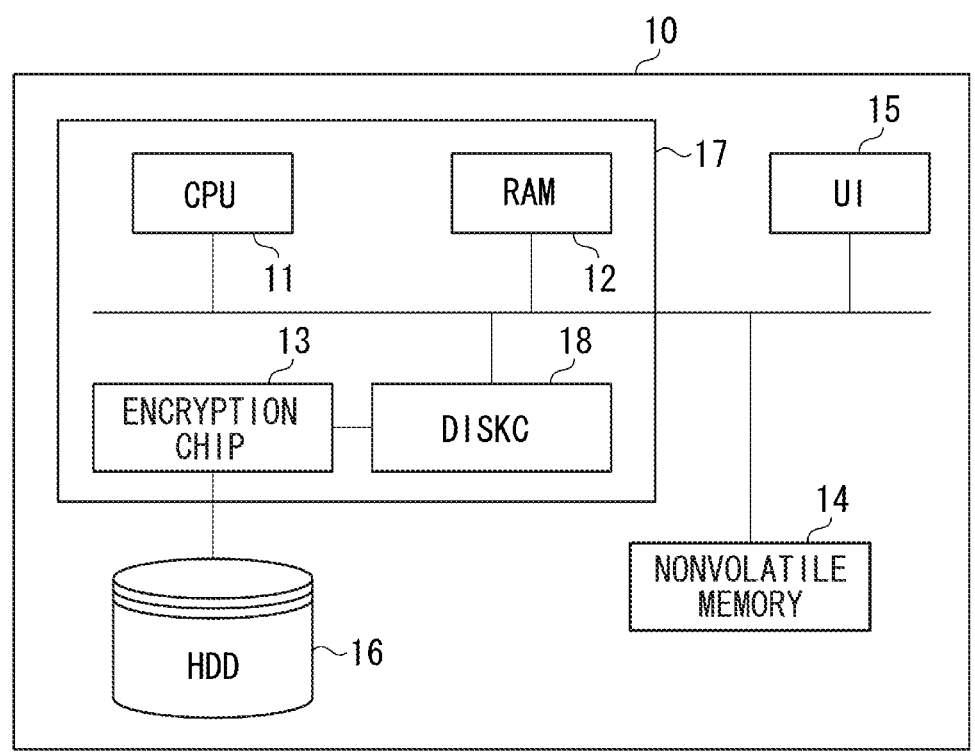
FIG. 1 is a hardware block diagram illustrating an information processing apparatus.

FIG. 1 is a hardware block diagram illustrating an information processing apparatus according to the present exemplary embodiment. The information processing apparatus according to the present exemplary embodiment is applicable, for example, to a personal computer (PC) and a server. The information processing apparatus according to the present exemplary embodiment is also applicable to a printer and a multifunctional peripheral.

An information processing apparatus 10 illustrated in FIG. 1 includes a central processing unit (CPU) 11, a random access memory (RAM) 12, an encryption chip 13, a nonvolatile memory 14, an operation unit (hereinafter, referred to as a user interface (UI)) 15, a disk controller (DISKC) 18, and a hard disk drive (HDD) 16. Although not illustrated, the information processing apparatus 10 may include a network interface connected to a local area network (LAN) to enable communication with network devices.

The CPU 11 is a processor for controlling the information processing apparatus 10, and controls the information processing apparatus 10 by using programs and data stored in the RAM 12. The RAM 12 is a readable/writable volatile storage device, and stores an information processing apparatus control program 20 illustrated in FIG. 2 (described below) and other various types of data. The encryption chip 13 controls writing and reading of data to and from the HDD 16, encrypts data when writing data, and decrypts data when reading data. A UI 15 includes a liquid crystal display (LCD) unit, a touch panel, and hardware keys (not illustrated) to acquire an operation instruction from a user, and displays a status of the information processing apparatus 10.

The HDD 16 is a readable/writable nonvolatile mass storage device, and stores various types of data. Various types of data such as document files and user files are stored in the HDD 16. Although, in the information processing apparatus 10 according to the present exemplary embodiment, the HDD 16 is used, other nonvolatile storage devices such as a solid state drive (SSD) may be used. Further, a plurality of storage devices may be used.

The DISKC 18 is a disk controller for controlling the encryption chip 13 and the HDD 16, and controls writing and reading of data to and from the HDD 16.

According to the present exemplary embodiment, the CPU 11, the RAM 12, the encryption chip 13, and the DISKC 18 are mounted on a controller board (also called a main board or a first board) 17. When the controller board is replaced because of a malfunction of any one component, all of these components will also be replaced at the same time.

The nonvolatile memory 14 is a readable/writable nonvolatile storage device, and stores programs and an encryption key for backup (backup encryption key) to be described below. For example, the nonvolatile memory 14 is composed of a flash memory. According to the present exemplary embodiment, the component including at least the nonvolatile memory 14 is mounted on a board (also referred to as a sub board or a second board) different from the controller board 17.

Figure 2:
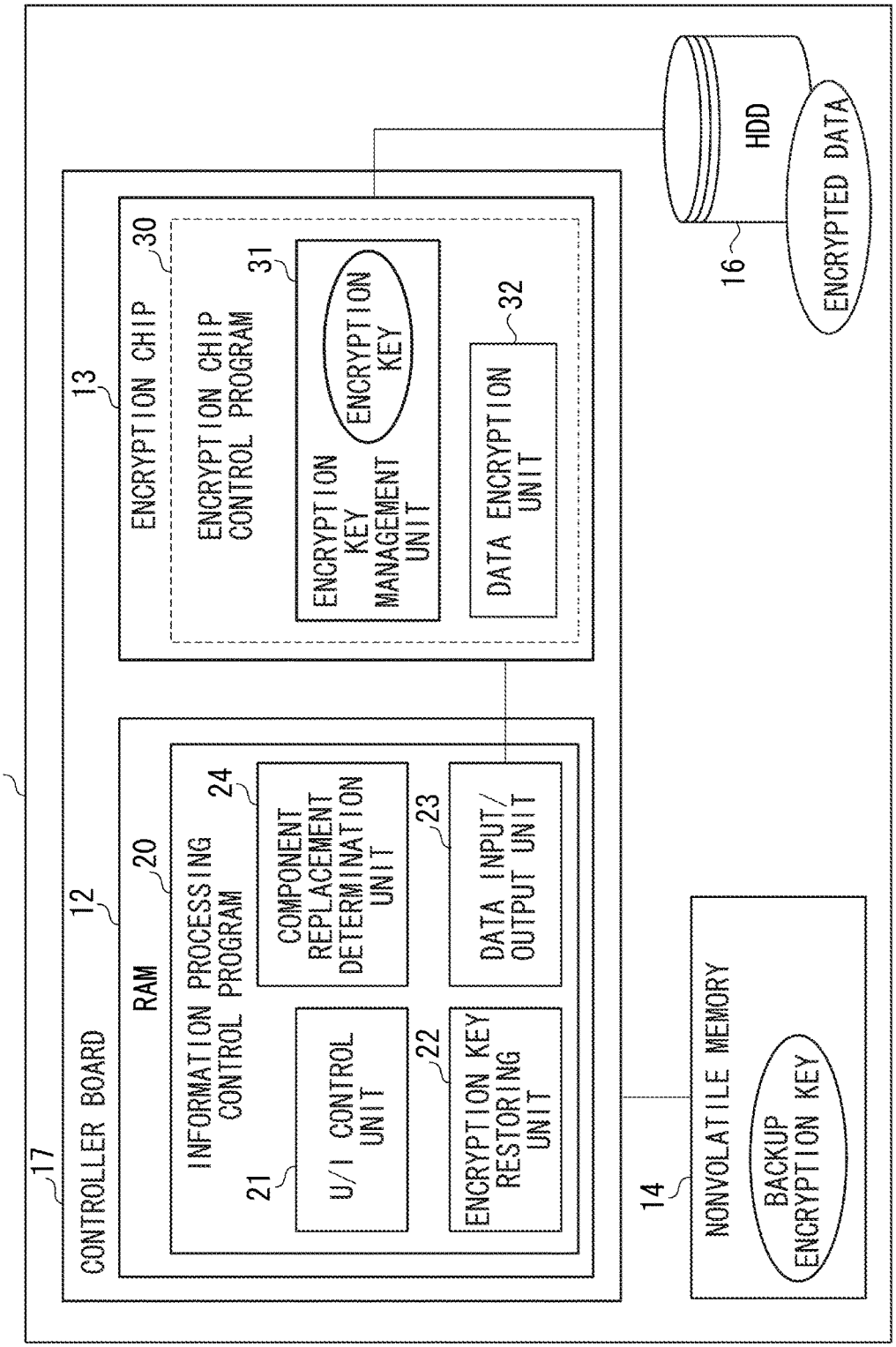
FIG. 2 is a schematic diagram illustrating the information processing apparatus.

FIG. 2 is a schematic view illustrating a logical configuration and a data configuration of the information processing apparatus 10 according to the present exemplary embodiment. The information processing apparatus 10 includes an information processing apparatus control program 20 and an encryption chip control program 30. The information processing apparatus control program 20 stored in the nonvolatile memory 14 is loaded into the RAM 12 and then executed by the CPU 11. The encryption chip control program 30 stored in the encryption chip 13 operates on the encryption chip 13. The information processing apparatus control program 20 includes a UI control unit 21, an encryption key restoring unit 22, a data input/output unit 23, and a component replacement determination unit 24. The encryption chip control program 30 includes an encryption key management unit 31 and a data encryption unit 32. Although the information processing apparatus control program 20 includes processing for operating various functions of the information processing apparatus 10, the processing is not directly related to the present exemplary embodiment and descriptions thereof will be omitted.

The UI control unit 21 controls the UI 15 to acquire a user's instruction from the touch panel and the hardware keys, and display the status of the information processing apparatus 10 on the LCD panel.

The encryption key restoring unit 22 performs control to back up an encryption key managed by the encryption chip 13 into the nonvolatile memory 14, and performs control to restore a backup encryption key managed in the nonvolatile memory 14 to the encryption chip 13.

The data input/output unit 23 controls writing and reading of data to and from the HDD 16. However, since writing and reading of data to and from the HDD 16 are performed via the encryption chip 13, the data input/output unit 23 actually controls writing and reading of data to and from the encryption chip 13. The data input/output unit 23 also various settings for the encryption chip 13.

The component replacement determination unit 24 determines whether each component of the information processing apparatus 10 has been replaced. More specifically, the component replacement determination unit 24 determines whether each of the controller board 17, the HDD 16, the nonvolatile memory 14 has been replaced. Processing for this determination will be described in detail below. The encryption key management unit 31 manages an encryption key to be used for data encryption and decryption performed by the data encryption unit 32. Upon reception of an instruction for storing data in the HDD 16 from the data input/output unit 23, the data encryption unit 32 performs data encryption processing before storing the data. Upon reception of an instruction for reading data from the HDD 16 from the data input/output unit 23, the data encryption unit 32 reads data from the HDD 16, decrypts the data, and transfers the decrypted data to the data input/output unit 23.

Data arrangement in the information processing apparatus 10 will be described below with reference to FIG. 2. Referring to FIG. 2, the encryption chip 13 is mounted on the controller board 17. Therefore, when the controller board 17 is replaced, the encryption chip 13 is replaced together with the controller board 17. In this case, since the encryption key for data encryption is stored in the encryption chip 13, the encryption key will be lost by the replacement of the controller board 17.

Accordingly, the present exemplary embodiment offers a method for restoring the encryption key when the controller board is replaced, by storing the backup encryption key in the nonvolatile memory 14 provided on a board different from the controller board 17. When the backup encryption key is stored in the nonvolatile memory 14, it is desirable to store the backup encryption key by using a secure storing method to prevent it from being exposed. Generally, there are various secure storing methods, and descriptions thereof will be omitted. The backup encryption key for backup is not limited to the encryption key itself, and may be data required to generate and configure the encryption key.

Figure 3:
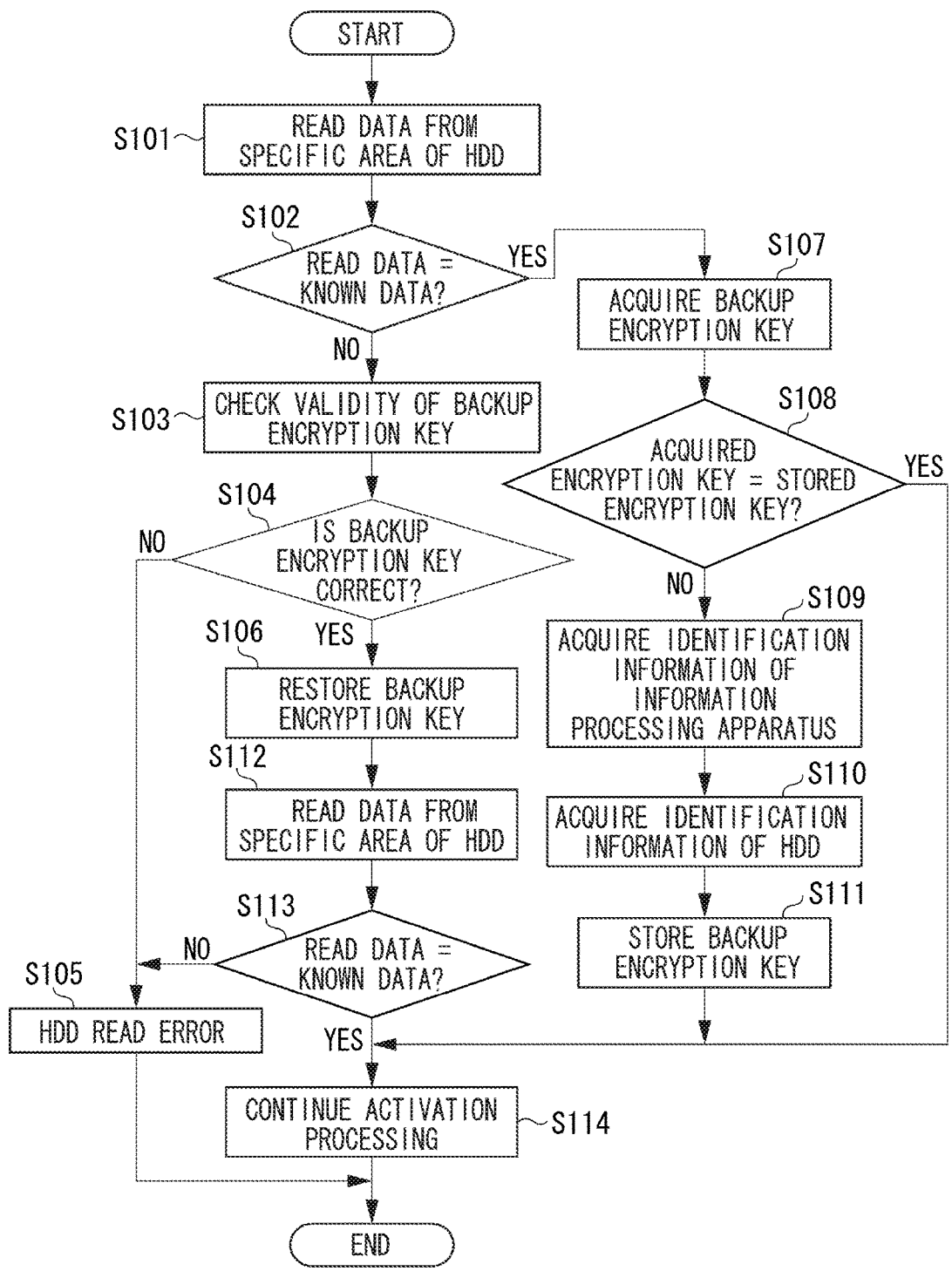
FIG. 3 is a flowchart illustrating activation processing for the information processing apparatus.

Activation processing in the information processing apparatus 10 will be described below with reference to FIG. 3. When the information processing apparatus 10 is activated by turning power on, the processing illustrated in FIG. 3 will be started. The processing illustrated in this flowchart is executed by the CPU 11 and the encryption chip 13 of the information processing apparatus 10.

In step S101, to confirm whether the controller board 17 has been replaced, the component replacement determination unit 24 confirms whether the encryption key in the encryption chip 13 is consistent with encrypted data in the HDD 16.

In step S101, the component replacement determination unit 24 instructs the data input/output unit 23 to read data from a specific area of the HDD 16. The data input/output unit 23 further requests the encryption chip 13 to read the data. The data encryption unit 32 reads data from the specific area of the HDD 16, decrypts the data by using the encryption key managed by the encryption key management unit 31, and transfers the decrypted data to the data input/output unit 23. The data input/output unit 23 transfers the data to the component replacement determination unit 24. In step S102, the component replacement determination unit 24 compares predetermined known data with the data received from the data input/output unit 23. When the received data coincides with the known data (YES in step S102), the data has been correctly decrypted, i.e., the encryption key is consistent with the encrypted data. Therefore, the component replacement determination unit 24 determines that the controller board 17 has not been replaced. On the other hand, when the received data does not coincide with the known data (NO in step S102), the data has not been correctly decrypted, i.e., the encryption key is not consistent with the encrypted data. Therefore, the component replacement determination unit 24 determines that the encryption key has been changed, in other words, the controller board 17 has been replaced. To perform the above-described data comparison, it is necessary for the component replacement determination unit 24 to prestore the predetermined known data in a specific area of the HDD 16, for example, when the HDD 16 is formatted. In this case, the known data is stored in the HDD 16 after being encrypted by the data encryption unit 32 of the encryption chip 13. Although, in this case, the component replacement determination unit 24 determines whether the controller board 17 has been replaced by confirming whether the encryption key is consistent with the encrypted data, other methods for determining the replacement of the component may be employed.

In step S102, since the received data coincides with the known data, the component replacement determination unit 24 determines that the controller board 17 has not been replaced (YES in step S102). Then, in step S107, the information processing apparatus 10 performs processing for backing up the encryption key stored in the encryption chip 13.

More specifically, to confirm whether the component including the nonvolatile memory 14 has been replaced, the component replacement determination unit 24 confirms whether the backup encryption key stored in the nonvolatile memory 14 is consistent with the encryption key stored in the encryption chip 13. In step S107, the component replacement determination unit 24 requests the data input/output unit 23 to acquire the encryption key from the encryption chip 13, and acquires the backup encryption key. The component replacement determination unit 24 further requests the encryption key restoring unit to acquire the backup encryption key stored in the nonvolatile memory 14, and acquires the stored backup encryption key. In step S108, the component replacement determination unit 24 compares the backup encryption key acquired from the encryption chip 13 with the stored backup encryption key. When the acquired backup encryption key coincides with the stored backup encryption key (YES in step S108), the component replacement determination unit 24 determines that the component including the nonvolatile memory 14 has not been replaced. Then, in step S114, the information processing apparatus 10 determines that backup processing is not necessary and continues activation processing without performing the backup processing.

On the other hand, when the acquired backup encryption key does not coincide with the stored backup encryption key (NO in step S108), the component replacement determination unit 24 determines that the component including the nonvolatile memory 14 has been replaced. Then, the information processing apparatus 10 performs processing in steps S109 to S111 to back up the encryption key stored in the encryption chip 13 to a nonvolatile memory included in the component after the replacement.

More specifically, the component replacement determination unit 24 instructs the encryption key restoring unit 22 to back up the backup encryption key acquired from the encryption chip 13 in step S107 into the nonvolatile memory included in the component after the replacement. In step S109, the encryption key restoring unit 22 acquires identification information (for example, the serial number) of the information processing apparatus 10. In step S110, the encryption key restoring unit 22 requests the data input/output unit 23 to acquire identification information of the connected HDD 16, and acquires the identification information of the HDD 16.

In step S111, the encryption key restoring unit associates the identification information of the information processing apparatus 10 and the identification information of the HDD 16 with the backup encryption key acquired in step S107, and stores the backup encryption key in the nonvolatile memory 14. In step S114, the information processing apparatus 10 continues the activation processing. In this case, although the identification information may be stored as it is together with the backup encryption key, a value such as a hash calculated based on the identification information may be stored together with the backup encryption key.

When the stored backup encryption key does not exist in step S107, the component replacement determination unit 24 determines that the nonvolatile memory 14 has been replaced (NO in step S108), and the processing proceeds to step S109. In step S109, the information processing apparatus 10 backs up the encryption key. Although, in this case, the component replacement determination unit 24 determines whether the nonvolatile memory 14 has been replaced by confirming whether the encryption key in the encryption chip 13 coincides with the stored backup encryption key, other methods for determining the replacement may be employed.

When the received data does not coincide with the known data, and the component replacement determination unit 24 determines that the controller board 17 has been replaced (NO in step S102), the processing proceeds to step S103. In step S103, the information processing apparatus 10 performs processing for restoring the encryption key. In step S103, the encryption key restoring unit 22 acquires the backup encryption key stored in the nonvolatile memory 14, and confirms the validity of the backup encryption key. In step S104, the encryption key restoring unit 22 acquires the identification information of the information processing apparatus 10 and the identification information of the HDD 16 connected to the data input/output unit 23, and compares the two pieces of the identification information with the identification information stored in the nonvolatile memory 14 together with the backup encryption key. When all of these pieces of the identification information coincide with each other, the encryption key restoring unit 22 determines that the backup encryption key is correct (YES in step S104), and the processing proceeds to step S106. In step S106, the encryption key storing unit 22 requests the data input/output unit 23 to restore the backup encryption key into the encryption chip 13 included in the component after the replacement.

More specifically, in step S106, the data input/output unit 23 sets the backup encryption key acquired from the nonvolatile memory 14 in the encryption chip 13. Then, the encryption key management unit 31 of the encryption chip 13 stores the backup encryption key set as a new encryption key by the data input/output unit 23.

In step S112, similar to step S101, the information processing apparatus 10 reads data from the specific area of the HDD 16. In step S113, the information processing apparatus 10 compares the read data with the predetermined known data.

When the read data does not coincide with the known data (NO in step S113), then in step S105, the information processing apparatus 10 displays a data read error from the HDD 16 on the UI 15. Then, the processing ends the processing of the flowchart. On the other hand, when the read data coincides with the known data (YES in step S113), then in step S114, the information processing apparatus 10 continues the activation processing by using the replaced encryption key (restored encryption key) for data encryption and decryption.

When the above-described pieces of the identification information do not coincide with each other, and the encryption key restoring unit 22 determines that the backup encryption key stored in the nonvolatile memory is not correct (NO in step S104), the encryption key restoring unit 22 skips the processing for restoring the encryption key, i.e., the processing proceeds to step S105. In step S105, the UI control unit 21 displays a data read error from the HDD 16 on the UI 15, and the processing is ended. In addition, when the information processing apparatus 10 is operable even if the data stored in HDD 16 cannot be read, the information processing apparatus 10 may be activated in a degenerate mode.

Thus, when the information processing apparatus 10 according to the present exemplary embodiment determines that the component including the encryption key has been replaced, the information processing apparatus 10 restores the backup encryption key to the component after the replacement. When the information processing apparatus 10 according to the present exemplary embodiment determines that the component including the backup encryption key has been replaced, the information processing apparatus 10 backs up the encryption key in the component after the replacement. Automatically performing such backup and restoration processing during the activation processing enables backing up and restoring the encryption key without troubling the user, thus improving user-friendliness.

Further, confirming the validity of a backup encryption key by using the identification information of the information processing apparatus 10 and the identification information of the HDD 16 enables preventing the encryption key from being incorrectly restored.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-249410, filed Dec. 9, 2014, which is hereby incorporated by reference herein in its entirety.

What is claimed is:

1. An information processing apparatus comprising:
a storage device configured to store data;
an encryption chip mounted on a first board of the information processing apparatus, and configured to store an encryption key therein, the encryption chip encrypting data to be written into the storage device by using the encryption key, and decrypting data read from the storage device by using the encryption key;
a nonvolatile memory mounted on a second board, and configured to store a backup encryption key; and
a control unit configured to confirm whether the data stored in the storage device has been correctly decrypted by using the encryption key, and when the data has not been correctly decrypted, restore the backup encryption key to the encryption chip, and when the data has been correctly decrypted, back up the backup encryption key into the nonvolatile memory,
wherein the nonvolatile memory stores predetermined identification information in association with the backup encryption key,
wherein, the control unit acquires another identification information from a component to which the encryption key is restored when restoring the backup encryption key, and confirms whether the acquired another identification information is corresponding to the predetermined identification information stored in the nonvolatile memory,
wherein, in a case where it is determined that the acquired another identification information is corresponding to the predetermined identification information stored in the nonvolatile memory, the restoring of the backup encryption key to the component is permitted, and in a case where it is determined that the acquired another identification information is not corresponding to the predetermined identification information stored in the nonvolatile memory, the restoring of the backup encryption key to the component is not permitted, and
wherein the component has a new encryption chip to replace the encryption chip.

2. The information processing apparatus according to claim 1, wherein the backup encryption key is the encryption key or information required to generate the encryption key.

3. The information processing apparatus according to claim 1, wherein the control unit confirms whether the data stored in the storage device has been correctly decrypted by using the encryption key stored in the encryption chip at a time of activation.

4. The information processing apparatus according to claim 1, wherein the control unit confirms whether the data stored in the storage device has been correctly decrypted by using the restored backup encryption key, and when the data has not been correctly decrypted, the control unit notifies of an error.

5. The information processing apparatus according to claim 1,
wherein the nonvolatile memory stores identification information of the information processing apparatus together with the backup encryption key, and
wherein, the control unit acquires identification information when restoring the backup encryption key, and confirms whether the acquired identification information coincides with the identification information stored in the nonvolatile memory.

6. An information processing apparatus comprising:
a storage device configured to store data;
an encryption chip configured to store an encryption key and perform encryption processing on data to be written into the storage device, by using the encryption key;
a nonvolatile memory configured to store a back-up of the encryption key; and
a control unit configured to determine whether a component including the encryption chip and a component including the nonvolatile memory have been replaced respectively, and, based on a determination that the component including the encryption chip has been replaced, restore the encryption key backed up in the nonvolatile memory into an encryption chip after the replacement, and, based on a determination that the component including the nonvolatile memory has been replaced, back up the encryption key stored in the encryption chip into a nonvolatile memory after the replacement, wherein the nonvolatile memory stores predetermined identification information in association with the back-up of the encryption key, and wherein, the control unit acquires another identification information from the replaced component to which the back-up of the encryption key is restored when restoring the back-up of the encryption key, and confirms whether the acquired another identification information is corresponding to the predetermined identification information stored in the nonvolatile memory, and wherein, in a case where it is determined the acquired another identification information is corresponding to the predetermined identification information stored in the nonvolatile memory, the restoring of the back-up of the encryption key to the replaced component is permitted, and wherein, in a case where it is determined the acquired another identification information is not corresponding to the predetermined identification information stored in the nonvolatile memory, the restoring of the back-up of the encryption key to the replaced component is not permitted.

7. The information processing apparatus according to claim 6, wherein the control unit confirms whether the data stored in the storage device can be correctly decrypted by using the encryption key, in order to determine whether the component including the encryption chip has been replaced.

8. The information processing apparatus according to claim 7, wherein, after the control unit confirms that the data stored in the storage device can be correctly decrypted, when it is determined that the encryption key does not consistent with the backup encryption key, the control unit determines that the component including the nonvolatile memory has been replaced.

9. A method for controlling an information processing apparatus that stores an encryption key and a backup encryption key, into different components respectively, and that writes data encrypted by using the encryption key into a storage device, the method comprising:

restoring, based on a replacement of the component in which the encryption key is stored, the backup encryption key into a component after the replacement;

backing up, based on a replacement of the component in which the backup encryption key is stored, the encryption key as a backup encryption key to a component after the replacement;

storing predetermined identification information in association with the back-up of the encryption key; and acquiring another identification information from the replaced component to which the back-up of the encryption key is restored when restoring the back-up of the encryption key, and confirming whether the acquired another identification information is corresponding to the stored predetermined identification information, wherein, in a case where it is determined the acquired another identification information is corresponding to the stored predetermined identification information, the restoring of the back-up of the encryption key to the replaced component is permitted, and wherein, in a case where it is determined the acquired another identification information is not corresponding to the stored predetermined identification information, the restoring of the back-up of the encryption key to the replaced component is not permitted.

10. The method according to claim 9, further comprising:

confirming whether the data stored in the storage device can be correctly decrypted by using the encryption key; and determining whether the component including the encryption chip has been replaced.

11. The method according to claim 10, wherein, after the confirming confirms that the data stored in the storage device can be correctly decrypted, when it is determined that the encryption key does not consistent with the backup encryption key, the determining determines that the component has been replaced.

12. The method according to claim 9, wherein the backup encryption key is the encryption key or information required to generate the encryption key.

13. The method according to claim 9, wherein the confirming confirms whether the data stored in the storage device has been correctly decrypted by using the encryption key at a time of activation.

14. The method according to claim 9, further comprising confirming whether the data stored in the storage device has been correctly decrypted by using the restored backup encryption key, and when the data has not been correctly decrypted, notifying of an error.

15. The method according to claim 9, further comprising:

storing identification information of the information processing apparatus together with the backup encryption key; and acquiring identification information when restoring the backup encryption key, and confirming whether the acquired identification information coincides with the identification information.

* * * * *